United States Patent [19]

Holmes et al.

[11] Patent Number: 5,104,630
[45] Date of Patent: Apr. 14, 1992

[54] PROCESSES FOR REMOVING CARBONYL SULFIDE FROM HYDROCARBON FEEDSTREAMS

[75] Inventors: Ervine S. Holmes, Yorktown Heights; Alexander J. Kosseim, Rye, both of N.Y.

[73] Assignee: UOP, Des Plaines, Ill.

[21] Appl. No.: 611,565

[22] Filed: Nov. 13, 1990

[51] Int. Cl.$^5$ ............... C01B 17/00; C01B 17/16; C01B 31/20

[52] U.S. Cl. ............... 423/242; 423/220; 423/228; 423/232; 423/243; 423/245.2

[58] Field of Search ............... 423/244 A, 243, 245.2, 423/242 AR, 220, 228, 232

[56] References Cited

U.S. PATENT DOCUMENTS

| | | | |
|---|---|---|---|
| 3,642,430 | 2/1972 | Benson | 23/2 R |
| 3,856,921 | 12/1974 | Shrier et al. | 423/228 |
| 3,864,460 | 2/1975 | Connell | 423/574 |
| 4,112,050 | 9/1978 | Sartori et al. | 423/223 |
| 4,233,141 | 11/1980 | Beavon et al. | 423/243 |
| 4,336,233 | 6/1982 | Appl et al. | 423/228 |
| 4,717,552 | 1/1988 | Carnell et al. | 423/230 |
| 4,957,715 | 9/1990 | Grover et al. | 423/228 |

Primary Examiner—Gregory A. Heller
Attorney, Agent, or Firm—Thomas K. McBride; John G. Tolomei; John G. Cutts, Jr.

[57] ABSTRACT

Processes are disclosed for purifying hydrocarbon feedstreams, e.g, natural gas, to remove carbonyl sulfide and other acid gases such as carbon dioxide and hydrogen sulfide. The processes employ a conversion step to convert carbonyl sulfide to hydrogen sulfide and carbon dioxide followed by an absorption step to remove the carbon dioxide and hydrogen sulfide from the feedstream. Carbonyl sulfide is converted to carbon dioxide and hydrogen sulfide in the presence of an aqueous alkaline solution which preferably has the same composition as the absorption solution used in the absorption step.

7 Claims, 1 Drawing Sheet

PROCESSES FOR REMOVING CARBONYL SULFIDE FROM HYDROCARBON FEEDSTREAMS

FIELD OF THE INVENTION

The present invention relates to processes for purifying hydrocarbons. More specifically, the present invention is directed to improved processes for removing carbonyl sulfide as well as other acid gases, such as carbon dioxide and hydrogen sulfide, from hydrocarbon feedstreams, e.g., natural gas.

BACKGROUND OF THE INVENTION

Processes for the removal of acid gases from hydrocarbon feedstreams have been widely practiced in the hydrocarbon processing industry. Typical acid gas components removed by such processes include $CO_2$, $H_2S$, COS, $SO_2$, $SO_3$, $CS_2$, HCN and oxygen and sulfur derivatives of $C_1$-$C_4$ hydrocarbons, e.g., mercaptans. In such processes the gases are usually contacted with an absorption solution which is typically an aqueous alkaline solution that has capacity for the acid gases.

One common absorption solution is known as a "hot potash" solution. Typically, in a process utilizing a hot potash solution, a small amount of an amine is included as an activator for the aqueous base which typically contains an alkali metal salt or hydroxide, such as potassium carbonate, as the primary absorbing component in the solution. Processes which utilize such solutions are often used for the bulk removal of an acid gas such as $CO_2$. Other typical absorption solutions are those which utilize an amine, such as an alkanolamine, as the primary absorbing component with little or no alkali metal salt or hydroxide.

In a typical absorption process for removal of acid gases, a regenerable aqueous alkaline scrubbing solution is continuously circulated between an absorption zone where acid gases are absorbed and a regeneration zone where they are desorbed usually by steam-stripping or flashing or both. There are a number of patents which describe absorption solvents and processes, some of which are described below.

In U.S. Pat. No. 3,856,921, issued to Shrier et al., there is disclosed a process for removal of acid gases from fluids by use of a basic salt of an alkali or alkaline earth metal and an amine selected from the group consisting of 2-methylaminoethanol, 2-ethylaminoethanol, morpholine, pyrrolidine and derivatives thereof.

U.S. Pat. No. 3,642,430, issued to Benson, discloses processes for removing $CO_2$ and $H_2S$ from gaseous mixtures by alkaline scrubbing processes wherein at least two separate regeneration zones are provided. Various alkanolamines, such as monoethanolamine, diethanolamine and aminoacids are described as activators in the absorption solution.

U.S. Pat. No. 4,112,050, issued to Sartori et al., discloses a process whereby carbon dioxide-containing acidic gases are removed from a normally gaseous mixture by a process comprising contacting the normally gaseous mixture with an aqueous solution comprising: (a) a basic alkali metal salt or hydroxide and (b) an activator for the basic salt or alkali metal hydroxide comprising at least one sterically hindered amine.

U.S. Pat. No. 4,336,233, issued to Appl et al., discloses a process wherein an aqueous solution containing piperazine is used as a washing agent for removing impurities such as $H_2S$, $CO_2$ and COS from gases. The patent discloses that piperazine can also be used together with certain physical or chemical solvents to accelerate the absorption rate of $H_2S$, $CO_2$ and COS.

In processes such as described above, the presence of carbonyl sulfide in the feedstream can present a problem. In general, absorption solutions such as described above do not have a high capacity for carbonyl sulfide and thus, carbonyl sulfide often comprises a portion of the acid gas impurities left in the product stream. Although high solution circulation rates can be employed to remove carbonyl sulfide by absorption with absorption solutions, the cost of constructing and operating such absorption systems can be prohibitive. Accordingly, combined absorption/adsorption processes have been proposed.

U.S. Pat. No. 4,717,552, issued to Carnell et al., discloses a process wherein the desulfurization of natural gas is effected by using a bed of particulate absorbent comprising zinc oxide at below 30° C. before molecular sieve drying of the gas. The patent is directed to removing both water and hydrogen sulfide from a natural gas feedstream that also comprises carbon dioxide. It is known in the art that carbon dioxide and hydrogen sulfide can react to form carbonyl sulfide and that the reaction is reversible. The patent discloses that by removing the hydrogen sulfide in the zinc oxide bed prior to the molecular sieve drying stage, little or no carbonyl sulfide is formed during passage of the gas through the molecular sieve. The patent discloses at column 1, lines 39-46 that:

"While carbonyl sulfide can be removed, e.g., by an amine washing step or by absorption using a bed of a suitable absorbent material such as zinc oxide, amine washing steps are often undesirable as they also effect removal of carbon dioxide, which removal is often undesirable on economic grounds, while absorbent beds generally have only a poor capacity for carbonyl sulfide at low absorption temperatures."

U.S. Pat. No. 4,957,715, issued to Grover et al., relates to the purification of hydrocarbon containing gaseous mixtures which includes both carbon dioxide and one or more sulfur-containing compounds such as hydrogen sulfide, alkyl mercaptans, carbonyl sulfide and the like. The patent discloses contacting a feed gas with an absorbent capable of removing hydrogen sulfide and alkyl mercaptans and then contacting the effluent obtained therefrom with a liquid medium, e.g., an aqueous alkanolamine solution capable of removing carbon dioxide, hydrogen sulfide and alkyl mercaptans to produce a product gas having reduced concentrations of carbon dioxide, hydrogen sulfide and alkyl mercaptans. In the above-identified patent, it is disclosed that at least a portion and preferably substantially all of the carbonyl sulfide present in the effluent gas from the adsorber is converted to hydrogen sulfide in the absorption column and absorbed by the liquid medium.

U.S. Pat. No. 3,864,460, issued to Connell, discloses a process for removing hydrogen sulfide from natural or refinery gas streams by absorption with an alkaline liquid. The absorbed hydrogen sulfide is partially converted to sulfur in a Claus plant and the residual hydrogen sulfide and the tail gas from the Claus plant are concentrated by adsorption and recycled into the absorption stage at a higher concentration such that all of the hydrogen sulfide is removed from the gas stream as sulfur. The patent discloses that aqueous solutions of diethanolamine are preferred as the alkaline liquid when carbonyl sulfide is present in the contaminated gas.

Generally, the process methods described above have been effective for removing acid gases from hydrocarbon streams such as natural gas. As noted above, the processes that utilize a single liquid absorption solution to remove all of the acid gases often cannot be operated in an efficient manner with respect to each of the individual components removed, i.e., higher solvent circulation rates or more highly purified solvent may be required to remove components such as alkyl mercaptans and carbonyl sulfide than is required for the bulk removal of carbon dioxide, for example. Moreover, the processes that utilize an adsorption zone using a solid adsorbent for removing selected components and which additionally employ an absorption zone using a liquid absorbent for other components typically require separate regeneration schemes for the solid adsorbent and the liquid absorbent.

Accordingly, processes are sought for the removal of carbonyl sulfide as well as other acid gases such as hydrogen sulfide and carbon dioxide from gaseous and liquid hydrocarbon feedstreams. Moreover, processes are sought which can provide for the conversion of carbonyl sulfide to form carbon dioxide and hydrogen sulfide and the subsequent absorption of the more readily absorbable components in an absorption zone. In addition, processes are sought which can provide a highly integrated process that utilizes a common regeneration scheme.

SUMMARY OF THE INVENTION

The present invention provides processes for the removal of carbonyl sulfide as well as other acid gases, such as hydrogen sulfide and carbon dioxide, from gaseous or liquid hydrocarbon feedstreams. By virtue of the present invention, it is now possible to convert carbonyl sulfide in the feedstream to carbon dioxide and hydrogen sulfide both of which components are more readily absorbable in an absorption solution. In accordance with the present invention, the carbonyl sulfide is converted to carbon dioxide and hydrogen sulfide in the presence of an aqueous alkaline solution in a hydrolysis zone. The converted carbon dioxide and hydrogen sulfide is then absorbed with an absorption solution in an absorption zone at conditions effective for the absorption of carbon dioxide and hydrogen sulfide. Thus, by virtue of Applicants' invention, it is no longer necessary to tailor the absorption conditions for the more difficult removal of carbonyl sulfide, e.g., by providing high solution circulation rates to absorb carbonyl sulfide which can be excessive for hydrogen sulfide and carbon dioxide, or to provide a separate adsorption zone. Instead, the absorption conditions can be tailored for the removal of carbon dioxide and hydrogen sulfide, e.g., lower solution circulation rates.

In one aspect of the invention, there is provided a process for removing carbonyl sulfide from a feedstream containing carbonyl sulfide and hydrocarbons. The process comprises: (a) contacting the feedstream in a hydrolysis zone with an aqueous alkaline solution at an effective hydrolysis temperature to convert at least a portion of the carbonyl sulfide to hydrogen sulfide and carbon dioxide, withdrawing first effluent stream containing a reduced concentration of carbonyl sulfide relative to the feedstream; and (b) contacting at least a portion of the first effluent stream in an absorption zone with an absorption solution at effective conditions to absorb carbon dioxide and hydrogen sulfide, said conditions including an absorption temperature which is lower than the hydrolysis temperature, and withdrawing a second effluent stream containing a reduced concentration of carbon dioxide and hydrogen sulfide relative to the first effluent stream.

Preferably, the absorption solution used in the absorption zone comprises the aqueous alkaline solution used in the hydrolysis zone. Even more preferably, the absorption solution and the aqueous alkaline solution have the same composition. As such, the rich solution streams from the hydrolysis zone and the absorption zone can be combined and regenerated in a single regeneration zone. The regenerated solution can then be divided into two portions and recycled as required to the absorption zone and the hydrolysis zone.

In another aspect of the present invention, there is provided a process for removing carbon dioxide, hydrogen sulfide and carbonyl sulfide from a feedstream containing carbon dioxide, hydrogen sulfide and carbonyl sulfide and hydrocarbons. The process comprises: (a) contacting the feedstream in a hydrolysis zone with a first portion of a lean solution stream comprising an aqueous alkaline solution at an effective hydrolysis temperature to convert at least a portion of the carbonyl sulfide to carbon dioxide and hydrogen sulfide, withdrawing a first effluent stream containing a reduced concentration of carbonyl sulfide relative to the feedstream, and withdrawing a first rich solution stream comprising the aqueous alkaline solution, carbon dioxide and hydrogen sulfide; (b) contacting the first effluent stream in an absorption zone with a second portion of the lean solution stream at an effective absorption temperature to absorb carbon dioxide and hydrogen sulfide, said absorption temperature being lower than said hydrolysis temperature, withdrawing a product stream containing a reduced concentration of carbon dioxide and hydrogen sulfide relative to the first effluent stream, and withdrawing a second rich solution stream comprising the aqueous alkaline solution, carbon dioxide and hydrogen sulfide; (c) combining at least a portion of the first rich solution stream and the second rich solution stream and contacting the combined rich solution stream in a regeneration zone at effective conditions to desorb carbon dioxide and hydrogen sulfide, withdrawing a vent gas stream comprising carbon dioxide and hydrogen sulfide, and withdrawing the lean solution stream; (d) separating the lean solution stream into the first and second portions; and (e) recycling the first portion of the lean solution stream to the hydrolysis zone and the second portion of the lean solution stream to the absorption zone.

DETAILED DESCRIPTION OF THE INVENTION

Figure 1:
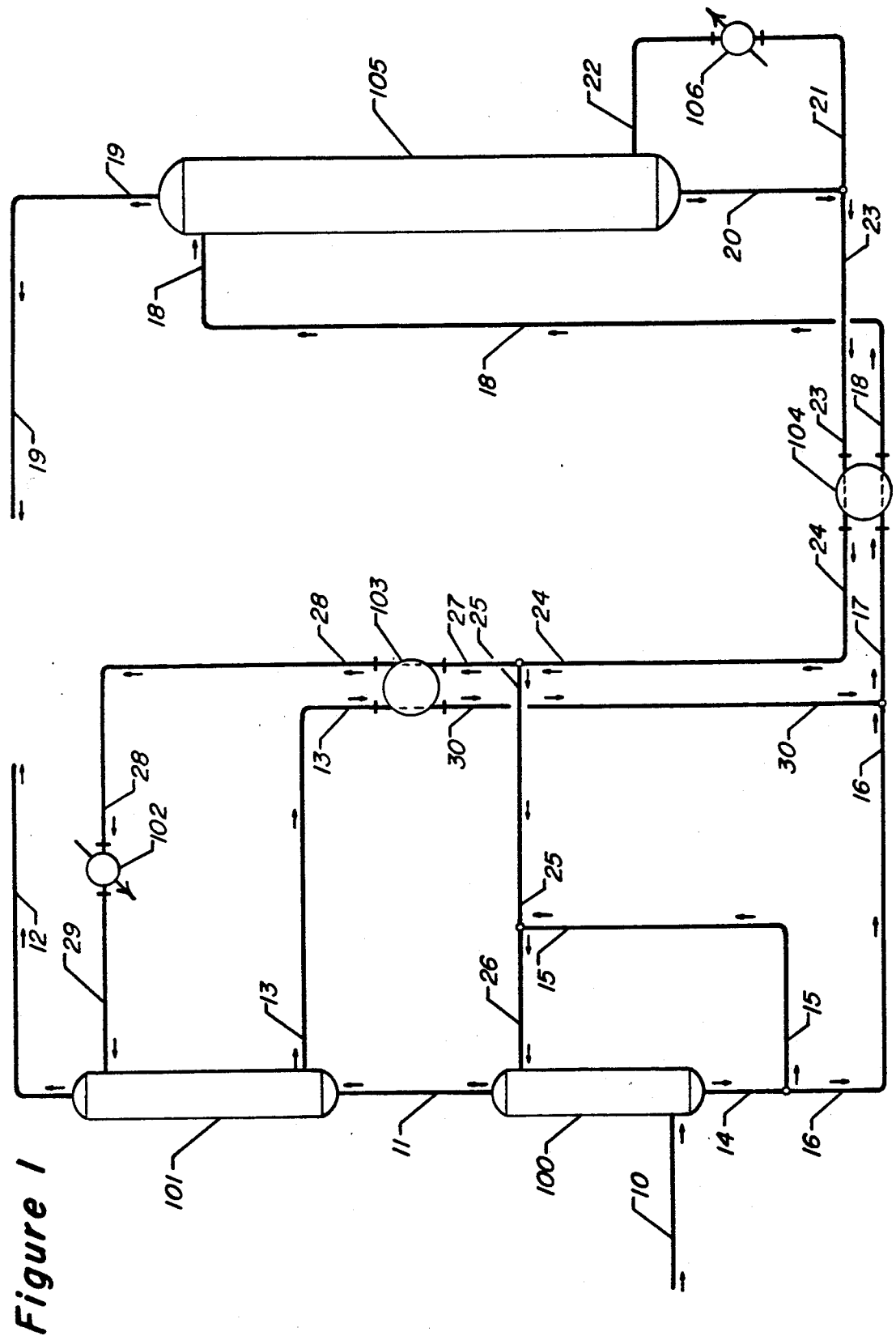
FIG. 1 illustrates a process flow diagram of a process in accordance with the present invention.

The feedstream processed in accordance with the present invention can generally be any hydrocarbon-containing gas or liquid which also includes carbonyl sulfide. Typically the feedstream will also contain at least one other acid gas component selected from carbon dioxide, hydrogen sulfide, and alkyl mercaptans and may contain other acid gas components such as sulfur oxides, thiophenes, disulfides and the like. The origin of the feedstream and its specific chemical make-up, other than as noted herein, are not critical to the present invention. Thus, the feedstream may, for example, be a hydrocarbon stream resulting from the destructive hydrogenation of coal or it may be obtained from deposits of natural gas or petroleum. The feedstream preferably includes molecules containing 1 to about 8 carbon atoms. More preferably, the major amount, i.e., about 50% or more, of the hydrocarbon molecules in the feedstream contain 1 to about 4 carbon atoms. A particularly preferred feedstream for treatment in accordance with the present invention is a natural gas that contains carbonyl sulfide.

The concentration of carbonyl sulfide is not a critical aspect of the present invention, except that there should be a sufficient amount present to justify its removal. Carbonyl sulfide is typically present in concentrations ranging from about 1 to 200 ppmv and preferably from about 5 to 100 ppmv. Also, when the feedstreams of the present invention are obtained from adsorption processes, e.g., drying units, carbonyl sulfide may be formed by the reaction of carbon dioxide and hydrogen sulfide on the adsorbent and thus, even fresh feeds with no carbonyl sulfide can be suitable feeds for processing in accordance with the present invention.

The amount of carbon dioxide, when present in the feedstream, is not critical to the present invention. Typically, however, the carbon dioxide content of the feedstream is at least about 2%, preferably at least about 5%, by volume of the total feedstream.

When hydrogen sulfide is present in the feedstream, its content is not critical. In fact, the present process is applicable when the feedstream contains small amounts of hydrogen sulfide, e.g., 10 parts per million by volume (ppmv) and when it contains a relatively high concentration of hydrogen sulfide, such as about 1000 ppmv or even 1 vol. % or more.

Similarly, the alkyl mercaptan content of the feedstream, when present, is not critical. Feedstreams typically contain at least about 20 ppmv and can contain more than about 70 ppmv of alkyl mercaptans such as, for example, methyl mercaptan, ethyl mercaptan, propyl mercaptans, butyl mercaptans and mixtures thereof. For purposes of the present invention, the alkyl mercaptans are categorized as acid gases.

The feedstream will typically contain some water and may also include one or more other impurities as well. Examples of other gaseous impurities typically present in only trace amounts include sulfur dioxide and carbon disulfide. Examples of other solid or liquid impurities are iron sulfide, iron oxide, high molecular weight hydrocarbons, and polymers. Any olefins having more than one double bond, triple bond hydrocarbons and, as a general rule, any material that will polymerize or react in situ is an undesirable impurity.

In accordance with the present invention, the feedstream is initially passed to a hydrolysis zone at effective conditions to convert COS to $H_2S$ and $CO_2$ in the presence of an aqueous alkaline solution. The effluent stream is then passed to an acid gas absorption zone wherein it is contacted with a lean absorption solution at conditions effective to absorb the acid gas components. Thus, by virtue of the present invention, it is now possible to tailor the conditions in each of the zones, e.g., temperature, pressure, solvent-to-feed ratio, etc., to the particular function performed in each zone. Hence, the present invention provides an improvement over single stage absorption processes wherein the conditions are set for absorption and some incidental hydrolysis takes place. The term "lean absorption solution" denotes an acid gas absorption solution that has capacity for the acid gas components ($CO_2$ and $H_2S$) at the absorption conditions. Similarly, the term "rich absorption solution" denotes an absorption solution that has increased concentrations of the acid gas components relative to the lean solution.

Preferably, the absorption solution comprises the aqueous alkaline solution. More preferably, the absorption solution has the same composition as the aqueous alkaline solution. When the same solution is used in both the hydrolysis zone and the absorption zone, the rich solutions obtained therefrom can conveniently be combined and regenerated in a single regeneration zone as hereinafter described. For purposes of discussion and ease of reference, the description provided hereinafter will be specifically directed to a single absorption solution comprising the aqueous alkaline solution. However, it is to be understood that the description applies equally to an aqueous alkaline solution, i.e., a hydrolysis solution that has a different composition than the absorption solution.

Any suitable absorption solution may be used in accordance with the present invention provided it has capacity for the acid gas components and/or is effective for hydrolyzing carbonyl sulfides. The absorption solution is preferably regenerable, for example, by steam regeneration so that it may be repeatedly used in a cyclic absorption-regeneration operation. The use of a regenerable absorption solution to remove carbon dioxide and sulfur-containing compounds from hydrocarbon containing feedstreams is conventional and well known in the art. Such conventional processing is included within the scope of the present invention. Such conventional processing is described, for example, in Benson et al., U.S. Pat. No. 2,886,405 and in Benson, U.S. Pat. Nos. 3,563,695; 3,563,696; 3,685,960; 3,823,222 and 4,160,810 and in Butwell et al., U.S. Pat. No. 4,184,855. Each of these patents is incorporated in its entirety by reference herein.

One particularly useful absorption solution for use in the present invention includes aqueous solutions of alkali metal carbonates, particularly potassium carbonate, aqueous solutions of alkanolamines, particularly monoethanolamine, diethanolamine, methyldiethanolamine and mixtures thereof, aqueous solutions of alkali metal phosphates, and the like. Particularly preferred are relatively concentrated potassium carbonate aqueous solutions having potassium carbonate concentrations of about 15 to about 45 and more preferably about 20 to about 35% by weight. The above-described concentrations are calculated on the assumption that all of the potassium is present as potassium carbonate. Potassium carbonate aqueous solutions are preferably activated by the addition of additives such as amines, particularly alkanolamines, alkali metal borates, particularly potassium borate and sodium borates, arsenic oxides, amino acids such as glycine and other additives which tend to increase the rate of absorption or desorption of carbon dioxide and sulfur-containing compounds absorbed in the potassium carbonate solution. Particularly preferred additives for potassium carbonate solutions are the alkanolamines in amounts in the range of about 1 to about 10%, and more particularly about 1 to about 6% by weight. Diethanolamine is very useful from the standpoint of cost, relatively low volatility and effectiveness.

Another useful absorption solution is one that contains alkanolamines without alkali metal carbonates or hydroxides. This solution preferably contains 1 to 3 alkanol radicals wherein each alkanol radical has from 1 to about 3 carbon atoms and water. Example of the alkanolamines are monoethanolamine, diethanolamine and methyldiethanolamine. Other suitable alkanolamines are diisopropanolamine, monoisopropanolamine, monopropanolamine, dipropanolamine, tripropanolamine, and triisopropanolamine. Mixtures of alkanolamines can be used, and occasionally are preferred. Mixtures of amines in inert inorganic or organic compounds that have a high solubility for the components to be absorbed can be used. For example, a treating solution such as glycol amine and water, as described by Hutchinson in U.S. Pat. No. 2,177,068, can be used.

The hydrolysis zone and the absorption zone comprise one or more columns that may be suitably equipped with means for producing intimate gas-liquid contact. For such purposes, packing materials are used such as Raschig rings, Berl saddles, Intalox saddles, Pall rings or other types of packing bodies exposing a large surface of liquid to the gas flowing through the packing. In place of packing, other means such as plates, e.g., sieve trays, may be employed to provide intimate gas-liquid contact. The apparatus used in the processes of hydrolysis absorption, stripping and cooling contains additional equipment such as reboilers, filters, piping, turbines, pumps, flash tanks, etc. which are of conventional design and need not be further described herein.

It is preferred that the hydrolysis and absorption zones be essentially corrosion-free. This can be achieved in a system for carbon dioxide removal, for example, by using the corrosion inhibitors described in U.S. Pat. No. 3,808,140, issued to Mago et al., or using an apparatus made from various titanium alloys or various corrosion resistant stainless or carbon steels. When using the antimony or vanadium compounds of U.S. Pat. No. 3,808,140, the respective compounds are mixed together such that there is a ratio of from about 1 to 9 parts by weight of antimony compound to about 9 to about 1 part by weight of vanadium compound. The preferred ratios are from about 4 to 6 parts to about 6 to 4 parts with equal parts being most preferred. The combination of antimony and vanadium compounds is added in an amount of from about 0.01 to about 2% by weight.

The hydrolysis zone must be maintained at an effective hydrolysis conditions including a hydrolysis temperature effective to convert at least a portion of the carbonyl sulfide to hydrogen sulfide and carbon dioxide. Preferably, at least 50 wt. % and more preferably at least 75 wt. % of the carbonyl sulfide will be converted. Preferably, the hydrolysis temperature will be at least 100° F., preferably from about 150°-400° F., and more preferably from about 150°-250° F. The pressure in the hydrolysis zone is not critical to the present invention and will typically be in the range of about 100 to 2000 psia. The residence time, i.e., contact time, of the feedstream in the hydrolysis zone must also be effective to promote the conversion. Generally, residence times of from about 0.1 to 60 minutes are suitable, preferably from about 1 to 30 minutes and more preferably from about 1 to 10 minutes.

The absorption zone is maintained at effective conditions to absorb carbon dioxide and hydrogen sulfide, said conditions including an absorption temperature which is lower than the hydrolysis temperature. In this way, it is now possible to enhance the hydrolysis of carbonyl sulfide by operating the hydrolysis zone at an elevated temperature and enhance the absorption of the carbon dioxide and hydrogen sulfide by operating the absorption zone at a lower temperature than the hydrolysis zone. Preferably, the absorption temperature is less than 200° F., more preferably, from about 50°-150° F. and most preferably from about 100° to 150° F. Further, it is preferred that the conditions are effective to absorb at least 50 wt. % and more preferably at least 75 wt. % of the carbon dioxide and hydrogen sulfide. The absorption pressure is not a critical aspect of the present invention but will preferably be in the range of about 100 to 2000 psia. The residence time of the converted feedstream in the absorption zone is generally between about 0.1 to 60 minutes, and preferably from about 1 to 30 minutes and more preferably from about 1 to 10 minutes.

As noted above, the reaction of carbonyl sulfide to form hydrogen sulfide and carbon dioxide is a reversible reaction. Thus, it is normally not uncommon for carbon dioxide and hydrogen sulfide to combine and form carbonyl sulfide. Applicants have found, however, that when carbonyl sulfide is present in the feedstream and converted to hydrogen sulfide and carbon dioxide in the hydrolysis zone of the present invention, that only a minor portion of the reaction products reverse back to carbonyl sulfide. While not wishing to be bound to any particular theory, Applicants believe that the presence of the aqueous alkaline solution has some stabilizing effect on the carbon dioxide and hydrogen sulfide products.

As a result of converting carbonyl sulfide in the hydrolysis zone of the present invention, Applicants are able to operate the absorption zone at conditions that are effective for absorbing carbon dioxide and hydrogen sulfide and still effectively remove carbonyl sulfide from the feedstream. Thus, in prior processes, it was necessary to operate the absorption zone at conditions effective to absorb carbonyl sulfide or provide alternate means for its removal. As such, the processes were often operated at conditions that were not particularly effective for absorbing carbon dioxide and hydrogen sulfide. For instance, because the capacity of carbonyl sulfide in many absorption solutions is lower than for carbon dioxide or hydrogen sulfide, excessive solution circulation rates and/or highly purified lean solutions are often required in order to obtain the desired degree of carbonyl sulfide removal. Thus, Applicants' invention can be utilized to increase the throughput of existing acid gas absorption units that process carbonyl sulfide containing feedstreams.

It is to be understood that there will typically be some absorption occurring in the hydrolysis zone. Thus, at least periodically, it will be necessary to regenerate the aqueous alkaline solution. In addition, it will be necessary to at least periodically regenerate the rich absorption solution containing carbon dioxide and hydrogen sulfide obtained from the absorption zone. Preferably, the rich solution from the hydrolysis zone and the absorption zone are combined and passed to a regeneration zone to desorb carbon dioxide and hydrogen sulfide and produce a lean solution stream which is returned to the hydrolysis and absorption zones and a vent gas stream comprising the acid gas components. The regeneration zone preferably contains at least one regeneration column containing suitable packing materials or trays similar to the type described above with reference to the hydrolysis zone and the absorption zone.

Typically, the rich solution is contacted with steam to strip acid gases from the absorption solution. Conditions in the regeneration column preferably provide for the removal of at least about 60%, more preferably about 65% to about 80% and most preferably up to 98% or more of the acid gases present in the rich absorption solution. In general, the conditions include a temperature that is higher than the absorption temperature and/or a pressure that is lower than the absorption pressure. When steam stripping is employed, the temperature in the regeneration column is preferably in the range of about 225° to about 275° F. while the regeneration column pressure is preferably in the range of about 15 to about 35 psia. In addition, it may be desirable to employ reduced pressure regeneration techniques such as disclosed in U.S. Pat. No. 4,702,898, issued to Grover, said patent hereby incorporated by reference. Thus, contacting with a purge gas can be employed to enhance low pressure flashing in a suitable separation vessel for bulk regeneration of the rich absorption solution followed by steam stripping in the regeneration column.

The process of the present invention is hereinafter described with reference to the drawing which illustrates an aspect of the present invention. It is to be understood that no limitation to the scope of the claims which follow is intended by the following description. Those skilled in the art will recognize that the process flow diagram has been simplified by the elimination of many necessary pieces of process equipment including some valves, heat exchangers, process control systems, pumps, fractionation column overhead and reboiler systems, etc. It may also be readily discerned that the process flows presented in the drawing may be modified in many aspects without departing from the basic overall concept of the invention. For example, the number of heat exchangers shown in the drawing has been held to a minimum for purposes of simplicity. Those skilled in the art will recognize that the choice of heat exchange methods employed to obtain the necessary heating and cooling at various points within the processes is subject to a large amount of discretion. Accordingly, many possibilities exist for indirect heat exchange between different process streams. Depending on the specific location and circumstance of the installation of the subject process, it may also be desired to employ heat exchange against steam, hot oil, refrigerants, or process streams from other processing units not shown on the drawing.

Referring to FIG. 1, a natural gas feedstream containing about 50 ppmv carbonyl sulfide, 5.2 vol. % carbon dioxide and 2.6 vol. % hydrogen sulfide and natural gas hydrocarbons is passed by line 10 to hydrolysis zone 100 wherein the feedstream is countercurrently contacted with a lean solution stream in line 26, the source of which is hereinafter defined. The lean solution stream comprises an aqueous alkaline solution containing about 6.9 mol. % diethanolamine (DEA), 0.12 mol. % $CO_2$ and 0.01 mol. % $H_2S$, with the balance comprising water and a minor amount of corrosion inhibitor and antifoaming additives. The temperature and pressure within the hydrolysis zone are about 180° F. and 780 psia, respectively. In the hydrolysis zone, substantially all of the carbonyl sulfide is converted to hydrogen sulfide and carbon dioxide. A portion of the hydrogen sulfide and carbon dioxide present in the feedstream and formed by conversion of carbonyl sulfide is absorbed in the hydrolysis zone.

A first effluent stream comprising carbon dioxide, hydrogen sulfide and unconverted carbonyl sulfide, if any, is withdrawn from hydrolysis zone 100 by line 11 and passed to absorption zone 101 which is maintained at a temperature of about 120° F. and 780 psia. A heat exchanger can be used to cool the first effluent stream prior to entering the absorption zone, if desired. In the absorption zone, the first effluent stream is countercurrently contacted with another portion of the lean solution stream introduced by line 29 the source of which is hereinafter defined. In the absorption zone, substantially all of the carbon dioxide, hydrogen sulfide and remaining carbonyl sulfide is absorbed. A product stream containing about 100 ppmv carbon dioxide, 4 ppmv hydrogen sulfide and 3 ppmv carbonyl sulfide is withdrawn from the absorption zone by line 12.

A first rich solution stream is withdrawn from hydrolysis zone 100 by line 14 and a portion thereof is recycled by line 15 and combined with lean solution in line 25 to form line 26 as hereinbefore described. This recycling is performed in order to help control the temperature in the hydrolysis zone and to minimize the total solution circulation.

A second rich solution stream is withdrawn from absorption zone 101 by line 13 and heated to a temperature of about 190° F. in heat exchanger 103 by indirect heat exchange with a lean solution stream in line 27 the source of which is hereinafter defined. The heated second rich solution stream in line 30 is combined with the remaining portion of the first rich solution stream in line 16 and passed by line 17 to heat exchanger 104 wherein it is heated to a temperature of about 215° F. by indirect heat exchange with a lean solution stream in line 23 the source of which is hereinafter defined.

The combined rich solution stream is then passed to regeneration zone 105 by line 18 wherein acid gases are desorbed. The regeneration zone is maintained at a temperature of about 247° F. and a pressure of about 26 psia. A vent gas stream containing desorbed acid gases is withdrawn from regeneration zone 105 by line 19. A lean solution stream containing a reduced amount of acid gases relative to the combined rich solution stream is withdrawn by line 20. A portion of the lean solution stream in line 20 is passed by line 21 to reboiler 106 and then introduced to a lower portion of the column by line 22. The remaining portion is passed by line 23 to heat exchanger 104 wherein it is cooled to a temperature of about 215° F. by indirect heat exchange with line 17 as hereinbefore described. A first portion of the cooled lean solution stream in line 24 is diverted by line 25 and combined with recycle stream 15 as hereinbefore defined. The remaining portion of line 24 is passed by line 27 to heat exchanger 103 wherein it is cooled to a temperature of about 200° F. by indirect heat exchange with line 13 as hereinbefore described. The second portion of the cooled lean solution stream in line 28 is further cooled in cooler 102 to a temperature of about 120° F. and passed by line 29 to absorption zone 101 as hereinbefore described.

We claim:

1. A process for removing carbon dioxide, hydrogen sulfide and carbonyl sulfide from a feedstream containing carbon dioxide, hydrogen sulfide and carbonyl sulfide and hydrocarbons, said process comprising:
   (a) contacting the feedstream in a hydrolysis zone with a first portion of a lean solution stream comprising an aqueous alkaline solution at an effective hydrolysis temperature to convert at least a portion of the carbonyl sulfide to carbon dioxide and hydrogen sulfide, withdrawing a first effluent stream containing a reduced concentration of carbonyl sulfide relative to the feedstream, and withdrawing a first rich solution stream comprising the aqueous alkaline solution, carbon dioxide and hydrogen sulfide;

(b) contacting the first effluent stream in an absorption zone with a second portion of the lean solution stream at an effective absorption temperature to absorb carbon dioxide and hydrogen sulfide, said absorption temperature being lower than said hydrolysis temperature, withdrawing a product stream containing a reduced concentration of carbon dioxide and hydrogen sulfide relative to the first effluent stream, and withdrawing a second rich solution stream comprising the aqueous alkaline solution, carbon dioxide and hydrogen sulfide;

(c) combining at least a portion of the first rich solution stream and the second rich solution stream and contacting the combined rich solution stream in a regeneration zone at effective conditions to desorb carbon dioxide and hydrogen sulfide, withdrawing a vent gas stream comprising carbon dioxide and hydrogen sulfide, and withdrawing the lean solution stream;

(d) separating the lean solution stream into the first and second portions; and (e) recycling the first portion of the lean solution stream to the hydrolysis zone and the second portion of the lean solution stream to the absorption zone.

2. The process of claim 1 wherein hydrogen sulfide and carbon dioxide are absorbed in the hydrolysis zone.

3. The process of claim 1 wherein carbonyl sulfide is absorbed in the absorption zone.

4. The processes of claim 1 wherein the feedstream comprises at least 5 ppmv of carbonyl sulfide.

5. The process of claim 4 wherein the feedstream comprises from about 1 to 200 ppmv of carbonyl sulfide.

6. The process of claim 1 wherein the feedstream comprises hydrocarbons having from about one to twelve carbon atoms per molecule.

7. The process of claim 6 wherein the feedstream comprises natural gas.

* * * * *